United States Patent
Seki (10) Patent No.: US 9,588,305 B2
(45) Date of Patent: Mar. 7, 2017

(54) OPTICAL CONNECTOR PLUG

(71) Applicant: HONDA TSUSHIN KOGYO CO., LTD., Tokyo (JP)

(72) Inventor: Shinji Seki, Tokyo (JP)

(73) Assignee: HONDA TSUSHIN KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/024,114

(22) PCT Filed: Sep. 9, 2014

(86) PCT No.: PCT/JP2014/073731
§ 371 (c)(1),
(2) Date: Mar. 23, 2016

(87) PCT Pub. No.: WO2015/068461
PCT Pub. Date: May 14, 2015

(65) Prior Publication Data
US 2016/0231512 A1    Aug. 11, 2016

(30) Foreign Application Priority Data
Nov. 8, 2013    (JP) .................................. 2013-232049

(51) Int. Cl.
*G02B 6/38*    (2006.01)
(52) U.S. Cl.
CPC ........... *G02B 6/3893* (2013.01); *G02B 6/387* (2013.01); *G02B 6/3821* (2013.01)
(58) Field of Classification Search
CPC .... G02B 6/3821; G02B 6/387; G02B 6/3893; G02B 6/3807; G02B 6/3826; G02B 6/3879; G02B 6/389
See application file for complete search history.

(56) References Cited

U.S. PATENT DOCUMENTS

2003/0220008 A1    11/2003    Viklund et al.
2004/0047565 A1    3/2004    Cheng et al.
(Continued)

FOREIGN PATENT DOCUMENTS

JP    2004-354693    12/2004
JP    2006-134858    5/2006
(Continued)

OTHER PUBLICATIONS

International Search Report issued Dec. 16, 2014 in International (PCT) Application No. PCT/JP2014/073731 with English translation.

*Primary Examiner* — John M Bedtelyon
(74) *Attorney, Agent, or Firm* — Wenderoth, Lind & Ponack, L.L.P.

(57) ABSTRACT

An optical connector plug includes a front housing, configured to hold a ferrule and to be fitted with a fitting portion of a coupling counterpart member, and a rear housing, mounted to the front housing to be allowed to slide toward front and rear directions at a rear side of the front housing. The front housing includes a latching piece with elasticity. The latching piece includes a locking portion, engageable with an engaging portion for fitting of the coupling counterpart member, and a releasing portion, configured to release the locking portion from an engaging state with the engaging portion. The rear housing includes a releasing lever. The releasing lever includes a hook portion, formed at a front part and configured to engage with the releasing portion at a time of retreat of the rear housing, so as to activate a release, and a knob portion for retreat.

7 Claims, 11 Drawing Sheets

(56) References Cited

U.S. PATENT DOCUMENTS

| | | | |
|---|---|---|---|
| 2004/0247252 A1* | 12/2004 | Ehrenreich | G02B 6/3893 385/58 |
| 2005/0124201 A1* | 6/2005 | Lo | H01R 13/562 439/352 |
| 2006/0134963 A1 | 6/2006 | Lo et al. | |
| 2011/0058773 A1* | 3/2011 | Peterhans | G02B 6/3893 385/76 |
| 2011/0286702 A1 | 11/2011 | Nielson et al. | |
| 2012/0213478 A1 | 8/2012 | Chen et al. | |
| 2013/0216188 A1 | 8/2013 | Lin et al. | |

FOREIGN PATENT DOCUMENTS

| | | |
|---|---|---|
| JP | 2009-229545 | 10/2009 |
| JP | 2013-029580 | 2/2013 |

* cited by examiner

OPTICAL CONNECTOR PLUG

TECHNICAL FIELD

The present invention relates to an optical connector plug, especially, for an LC type optical connector, which is commonly worldwide used for optical communication equipments.

BACKGROUND ART

Figure 14A:
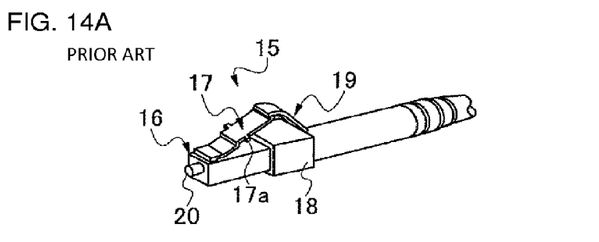
FIG. 14A is a perspective view illustrating a conventional optical connector plug.
Figure 14B:
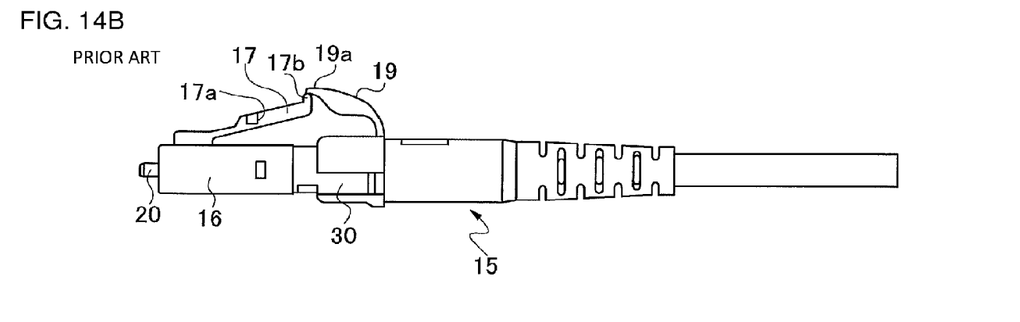
FIG. 14B is a side view illustrating the optical connector plug.

Conventional LC type optical connector plug has an attaching and detaching structure for coupling and releasing an adaptor or a receptacle, which are coupling counterpart members to be fitted and coupled with the plug. As shown in FIGS. 14A and 14B, an optical connector plug 15 is provided with a latching portion 17 curved and warped up from a front housing 16. A rear housing 18 is provide with a releasing bar 19 having a distal end 19a which extends opposite the latching portion 17 and which covers over and engages with a distal end 17b of the latching portion 17.

An engaging projection 17a protrudes on each of two side wall faces of the latching portion 17, configured to engage with a recess of a coupling counterpart member 21 such as an adaptor, and to prevent extraction. The releasing bar 19 extends upward from an upper face of the rear housing 18, and is forced to return to an upper original position by elastic force of the latching portion 17.

Figure 15A:
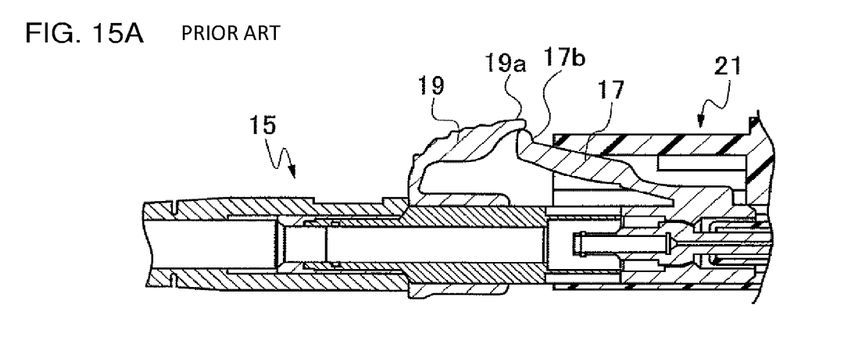
FIG. 15A is a partial section view illustrating a fitting state of the optical connector plug.
Figure 15B:
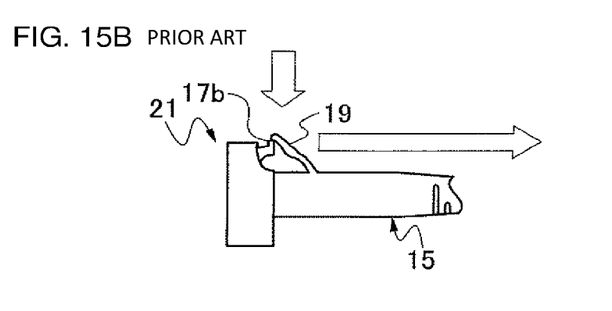
FIG. 15B is a schematic view illustrating a releasing operation when the optical connector plug is released from a coupling state with a coupling counterpart member.

In order to releasing the optical connector plug 15 in a coupling state with a coupling counterpart member 21 as shown in FIG. 15A, it is required to press down the releasing bar 19 with fingers to release engagement of the engaging projection 17a of the latching portion 17, and then to pull the optical connector plug 15 toward a direction apart from the coupling counterpart member 21 while keeping a state where the latching portion 17 is pressed down, as shown in FIG. 15B. A duplex connector plug described in PTL 1 is known as an example of the attaching and detaching structure of the optical connector plug 15 in this manner.

PRIOR ART DOCUMENT

Patent Document

PTL1: JP 2004-354693 A

SUMMARY OF INVENTION

Technical Problem

As described above, the conventional optical connector plug requires two operations, i.e., a pressing-down operation and a pulling operation, for release from the coupling counterpart member. It has bad operability since the pulling operation should be performed while the pressing-down state is kept. The LC type connector plugs are mounted with high density in an optical communication equipment. Work in the equipment requires an operator to push aside crowded optical cords, to pick the LC type connector plug smaller than his finger, and to unlock and release the LC type connector plug by performing the two operations. An optical connector plug of the present invention is proposed to solve these problems.

Solution to Problem

An optical connector plug according to the present invention includes: a front housing, configured to hold a ferrule and to be fitted with a fitting portion of a coupling counterpart member; and a rear housing, mounted to the front housing so as to be allowed to slide toward front and rear directions at a rear side of the front housing. The front housing includes: a front housing body; and a latching piece with elasticity, formed on an upper side outer wall face thereof. The latching piece includes: a locking portion, configured to engage with an engaging portion for fitting of the coupling counterpart member; and a releasing portion, configured to release the locking portion from an engaging state with the engaging portion for fitting. The rear housing includes: a tubular body; and a releasing lever, formed at an upper side thereof. The releasing lever includes: a hook portion, formed at a front part of the releasing lever and configured to engage with the releasing portion of the latching portion at a time of retreat of the rear housing, so as to activate a release function; and a knob portion for retreat, formed at a rear part of the releasing lever. The hook portion formed at the releasing lever loosely fits with a slit formed before the releasing portion, by the hook portion sliding with and entering under the releasing portion of the latching piece, a taper portion at a distal end side of the hook portion pushing up the releasing portion and the hook portion entering into the slit when the front housing and the rear housing of the optical connector plug are assembled.

Preferably, the locking portion formed to the latching piece is a pair of left and right locking portions protruding from left and right side wall faces of the latching piece having elasticity, and the releasing portion is formed between the pair of the left and right locking portions.

Preferably, a groove portion is formed at a rear side of the front housing, enabling to mount the blocking member at a position adjoining the front housing behind, the blocking member configured to block backward slide of the rear housing in a state where the rear housing is mounted to the rear side and is advanced. Preferably, the optical connector plug further includes a plug frame, put into a rear part of the front housing, and the groove portion is formed at a rear part of the plug frame.

Preferably, the blocking member has an annular tube shape with a C-shape section partially having a slit, so as to enable putting into the groove portion from a direction perpendicular to an axis line of a longitudinal direction of the front housing.

Preferably, the releasing lever of the rear housing is provided with a projection portion which protrudes between the hook portion formed at a front part and the knob portion formed at a rear part of the releasing lever, and which functions as a reaction force portion for advancing the rear housing.

Advantageous Effects of Invention

The optical connector plug according to the present invention enables to release the optical connector plug from the coupling counterpart member with a single operation. Only to do for release from the coupling counterpart member is to pull the releasing lever, provided to the rear housing, backward, i.e., toward a direction opposite a fitting direction. This achieves reduction of the number of operation for release, and improvement and enhancement of working operability.

The releasing portion provided between the pair of the locking portions makes a length of the latching piece shorter than that of the conventional latching piece, which is long along front and rear directions. This achieves reduction of material cost. The slit provided before the releasing portion reduces a material cost, and contributes to weight saving.

The blocking member for blocking slide of the rear housing provided for preventing mistaken release by the rear housing prevents the rear housing in a fitting state from unintentionally backward release. This enhances safety.

The blocking member having the annular tube shape with C-shape section facilitates a work to mount it on the groove portion of the plug frame. This enhances working efficiency. This is an excellent effect.

The releasing lever of the rear housing provided with the projection portion functioning as the reaction force portion for advance facilitates advance of the optical connector plug at a fitting time

EMBODIMENTS

Figure 1:
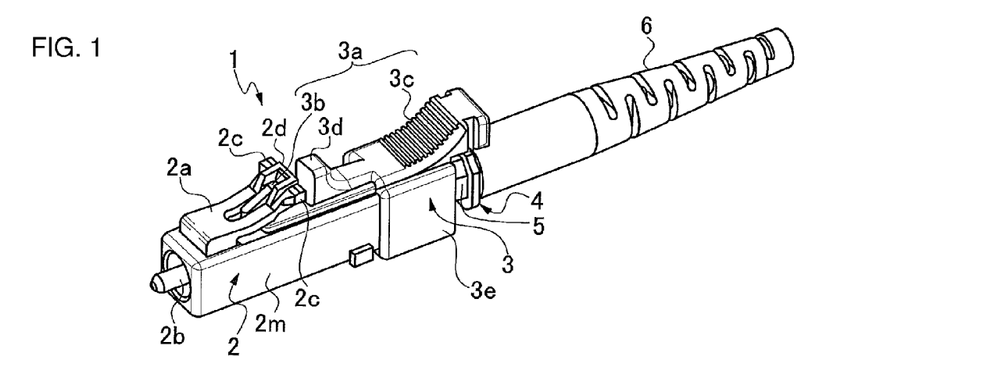
FIG. 1 is a perspective view illustrating an optical connector plug according to the present invention.
Figure 2:
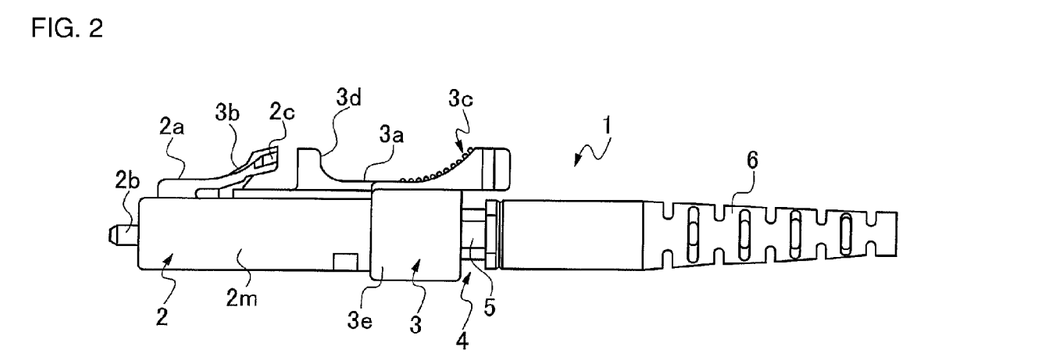
FIG. 2 is a side view illustrating the optical connector plug.

As shown in FIGS. 1 and 2, an optical connector plug 1 according to the present invention has a rear housing 3 provided with a releasing lever 3a for facilitating to release the rear housing 3 from coupling with a coupling counterpart member with one operation.

Embodiment 1

As shown in FIGS. 1 and 2, an optical connector plug 1 according to the present invention includes a front housing 2 having a front housing body 2m made of plastics with a roughly rectangular tube shape and configured to hold a ferrule 2b for optical communication connection and to be fitted with a fitting portion of a coupling counterpart member such as an adaptor or a receptacle, and a rear housing 3 having a tubular body 3e made of plastics with a rectangular shape and configured to be mounted so as to be allowed to slide front and rear directions at a rear side of the front housing 2.

A structure of the front housing 2 will be explained below. As shown in FIGS. 3A to 5, it has a latching piece 2a with elasticity formed on an outer wall face at an upper side of the front housing body 2m. The latching piece 2a is provided with a pair of locking portions 2c, configured to engage with engaging portions for fitting, not shown, of the coupling counterpart member, and a releasing portion 2d, for releasing the locking portions 2c from engagement with the engaging portions for fitting, not shown. The pair of the locking portions 2c formed to the latching piece 2a is configured to be located at a position to engage with the engaging portion, not shown, of the coupling counterpart member and to be locked, in an unloaded state. And it is configured to be located at a position to release engagement with the engaging portion, not shown, of the coupling counterpart member, in a pressing-down state. In other words, engagement between the pair of the locking portion 2c and the engaging portion for fitting of the coupling counterpart member achieves coupling and locking of the optical connector plug 1 with the coupling counterpart member such as an adaptor or a receptacle.

In the latching piece 2a, the pair of the locking portion 2c protrudes from left and right side wall faces at a rear end of the latching piece 2a toward left and right outsides. The releasing portion 2d of the latching piece 2a is formed between the pair of left and right locking portions 2c and 2c.

Figure 3A:
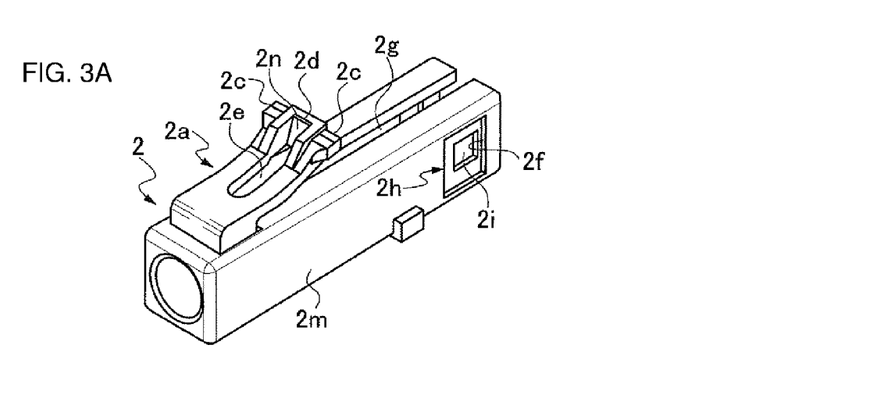
FIG. 3A is a front perspective view illustrating a front housing of the optical connector plug.
Figure 3B:
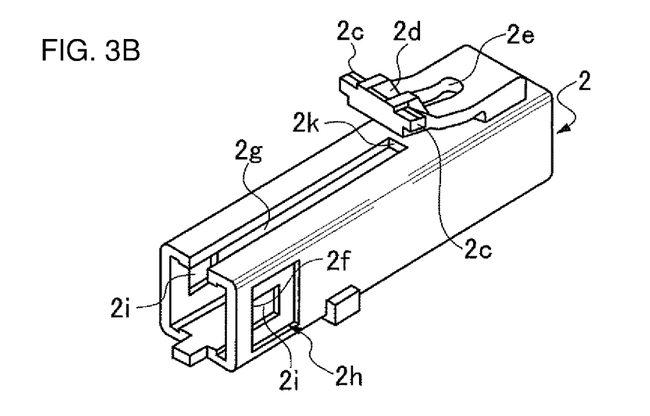
FIG. 3B is a rear perspective view illustrating the front housing shown in FIG. 3A.
Figure 4A:
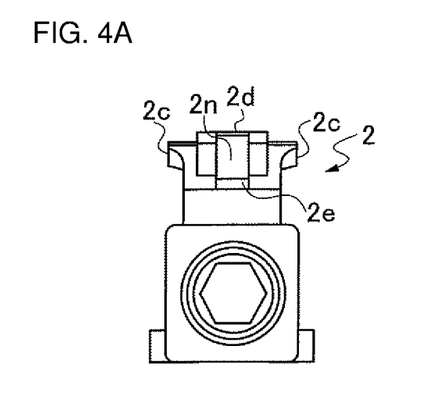
FIG. 4A is a front view illustrating the front housing.
Figure 4B:
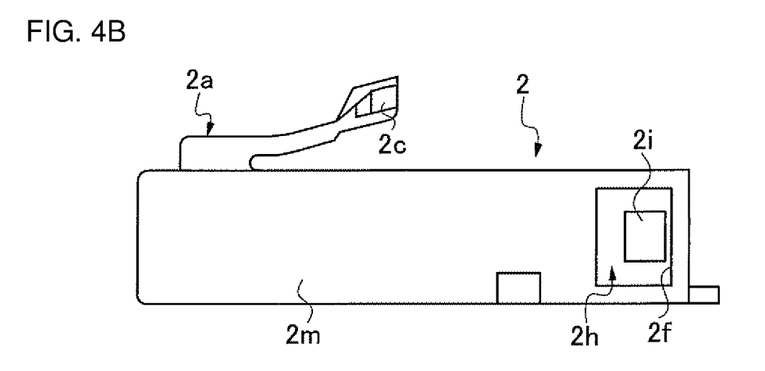
FIG. 4B is a side view illustrating the front housing.
Figure 4C:
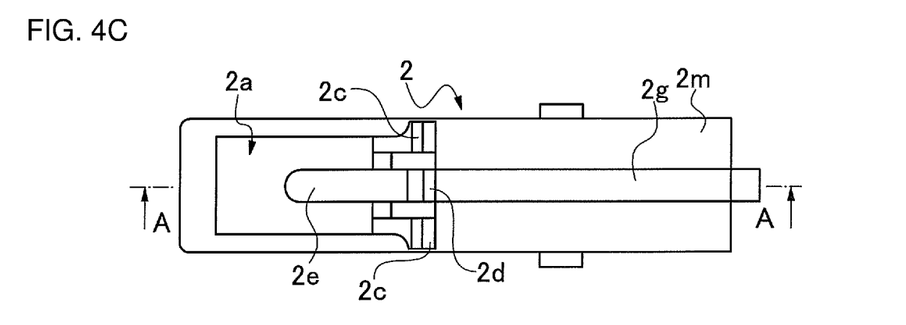
FIG. 4C is a plan view illustrating the front housing.
Figure 5:
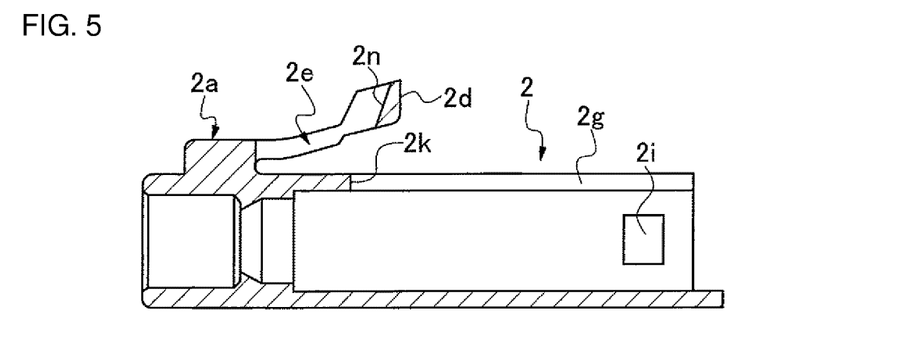
FIG. 5 is a section view along A-A line in FIG. 4C, illustrating the front housing.
Figure 6A:
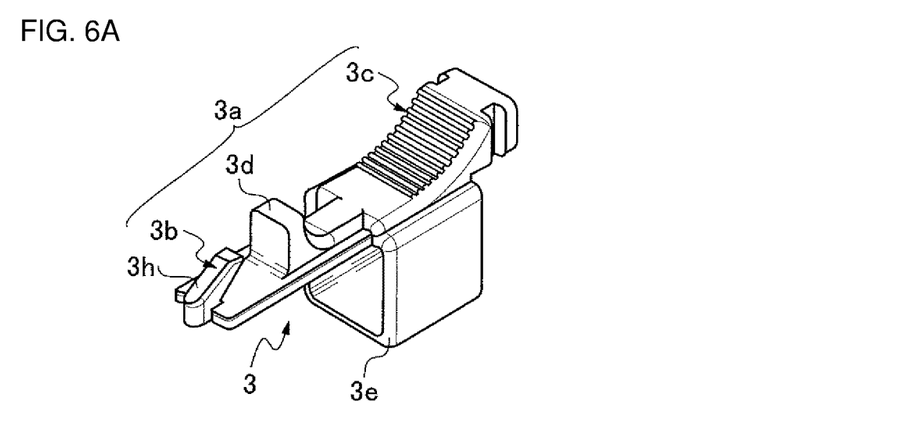
FIG. 6A is a front perspective view illustrating a rear housing of the optical connector plug.
Figure 6B:
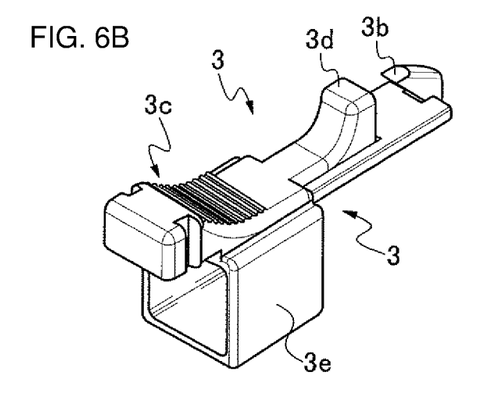
FIG. 6B is a rear perspective view illustrating the rear housing.

As shown in FIGS. 3A, 4C and 5, a sloping face 2n, where a front end is the lower, is formed at a front side of the releasing portion 2d. And a slit 2e is formed in front of it. In other words, the sloping face 2n, where a rear end is the higher, exists behind the slit 2e. As shown in FIG. 4B, a sign 2f indicates a rear restriction portion functioning as a stopper when the rear housing 3 moves backward as described below. A sign 2g indicates a guiding slit, as shown in FIG. 5, where a front restriction end face 2k at a distal end face functions as a position restriction portion of forward movement of the rear housing 3.

As shown in FIG. 4B, a sign 2h indicates a rear housing engaging recess formed so as to function as a retainer of the rear housing 3. A rear face of the rear housing engaging recess 2h is the rear restriction portion 2f for restricting backward movement of the rear housing 3. A sign 2i, shown in FIGS. 4B and 5, indicates a locking window portion for fitting and locking a plug frame 4, described below, with the front housing 2.

Next, a structure of the rear housing 3 will be explained below. As shown in FIGS. 6A to 8, the rear housing 3 has the tubular body 3e, and a releasing lever 3a formed on an upper part of the tubular body 3e. The releasing lever 3a has a hook portion 3b, which is formed at a front part of the releasing lever 3a, for engaging with the releasing portion 2d of the latching piece 2a so as to perform releasing when the rear housing 3 retreats, and a knob portion 3c for retreat, formed at a rear part of the releasing lever 3a.

The releasing lever 3a of the rear housing 3 is provided with a projection portion 3d, which protrudes between the hook portion 3b at a front part and the knob portion 3c at a rear part, and which functions as a reaction force portion for advancing the rear housing 3.

Figure 7A:
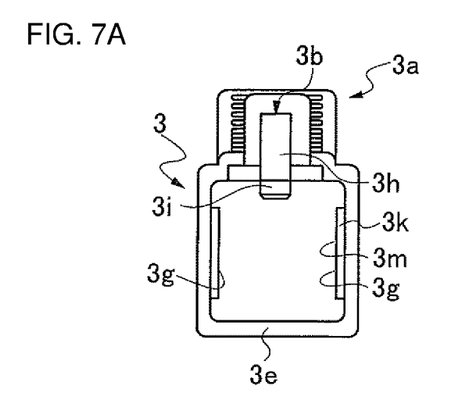
FIG. 7A is a front view illustrating the rear housing.
Figure 7B:
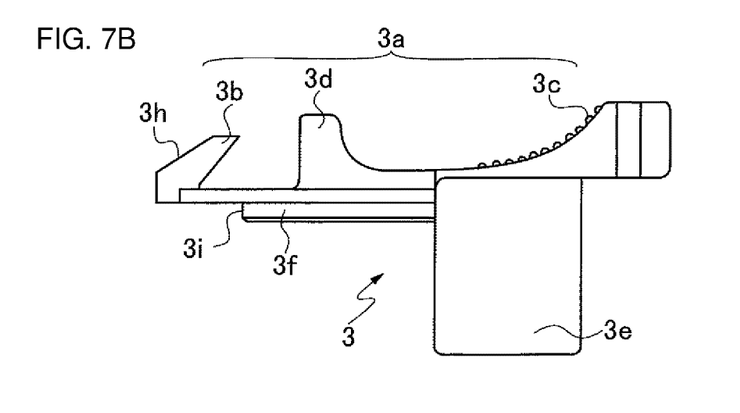
FIG. 7B is a side view illustrating the rear housing.
Figure 7C:
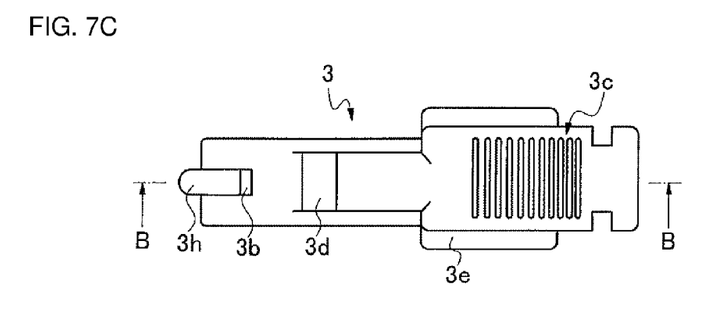
FIG. 7C is a plan view illustrating the rear housing.

As shown in FIG. 7B, a bottom face of the releasing lever 3a is provided with a guiding rail 3f with a long and narrow rectangular shape protruding along the front and rear directions. The guiding rail 3f is inserted from a back side to the guiding slit 2g formed on the front housing body 2m, and is guided along the front and rear directions. As shown in FIGS. 7A and 7B, a front end of the guiding rail 3f is a position restriction end portion 3i, which contacts with the front restriction end face 2k, shown in FIG. 5, of the guiding slit 2g, and restricts forward movement of the rear housing 3.

And, the tubular body 3e and the releasing lever 3a composing the rear housing 3 are integrally formed. The tubular body 3e is bigger than the front housing body 2m, so that the tubular body 3e is fitted with the front housing body 2m, surrounding its rear part having a tubular shape.

Figure 8:
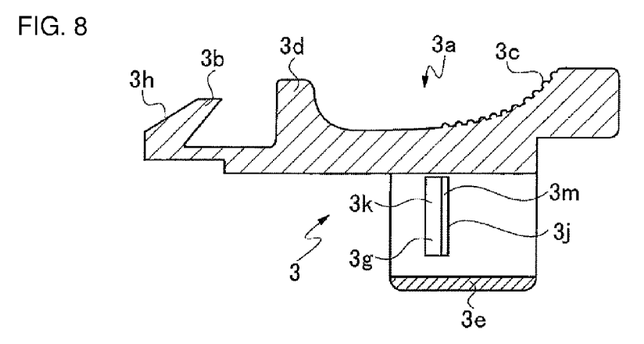
FIG. 8 is a section view along B-B line in FIG. 7C.

The tubular body 3e is provided with restriction projections 3g, shown in FIGS. 7A and 8, protruding on its left and right inner faces and having a taper face 3k, a top face 3m and a position restriction end face 3j. When the optical connector plug is assembled, the restriction projection 3g falls into and engages with the engaging recess 2h formed on the front housing body 2m. The position restriction end face 3j, shown in FIG. 8, contacts with the rear restriction portion 2f, which is a rear wall face of the engaging recess 2h. This blocks backward extraction of the rear housing 3 from the front housing 2, and achieves positioning.

Figure 9A:
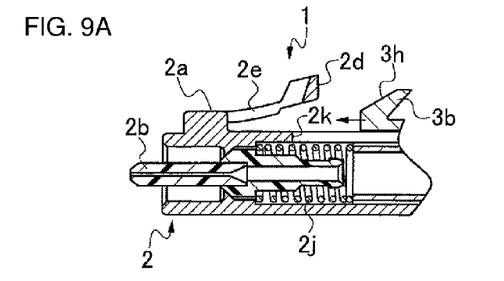
FIG. 9A is a partial vertical section of the front housing and the rear housing in a state before a releasing lever of the rear housing and a latching piece of the front housing are engaged in a process of fitting and assembling of the optical connector plug.
Figure 10A:
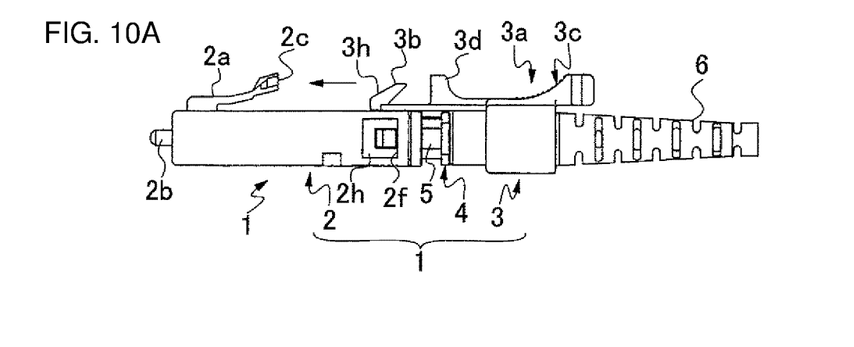
FIG. 10A is a side view illustrating the optical connector plug in the state before the releasing lever of the rear housing and the latching piece of the front housing are engaged.
Figure 10B:
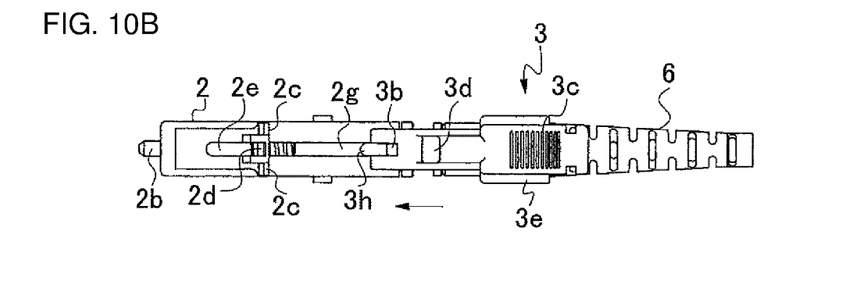
FIG. 10B is a plan view illustrating the optical connector plug.

In order to assemble the front housing 2 and the rear housing 3 as shown in FIG. 1, the ferrule 2b, the plug frame 4, described below, and the like are fitted into the front housing 2, as shown in FIGS. 9A, 10A and 10B. Then, the rear housing 3 is fitted with the front housing 2 from a rear side, so that the front housing body 2m is put into the tubular body 3e. And then, the rear housing 3 is advanced so as to be fitted and mounted as shown in FIG. 9A, 10A or 10B.

Figure 9B:
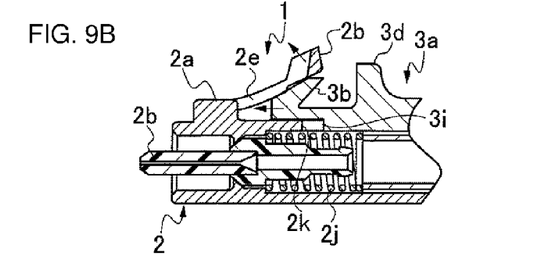
FIG. 9B is a partial vertical section of the front housing and the rear housing in a state where the rear housing advances from the state shown in FIG. 9A, the releasing lever and the latching piece are engaged, and a taper portion pushes up a releasing portion.
Figure 9C:
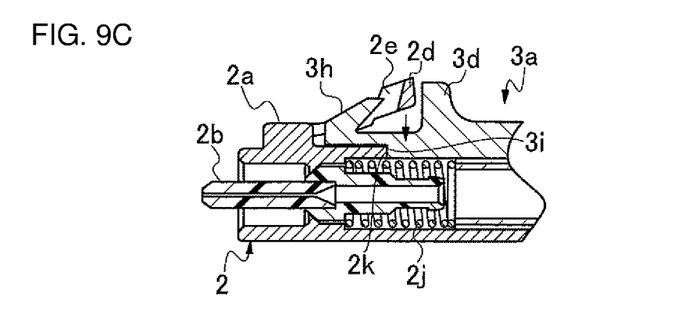
FIG. 9C is a partial vertical section of the front housing and the rear housing in a state where the rear housing advances further than in the state shown in FIG. 9B, a hook portion enters and loosely fits with a slit provided before the releasing portion, and the releasing portion returns downward to an original position by elasticity of the latching piece.
Figure 10C:
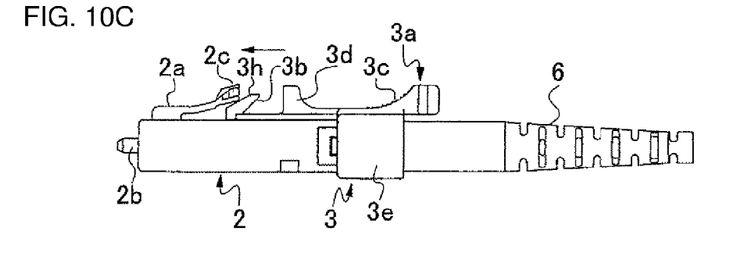
FIG. 10C is a side view illustrating the optical connector plug in the state where the rear housing advances from the state shown in FIG. 10A, the releasing lever and the latching piece are engaged, and the taper portion pushes up a releasing portion.
Figure 10D:
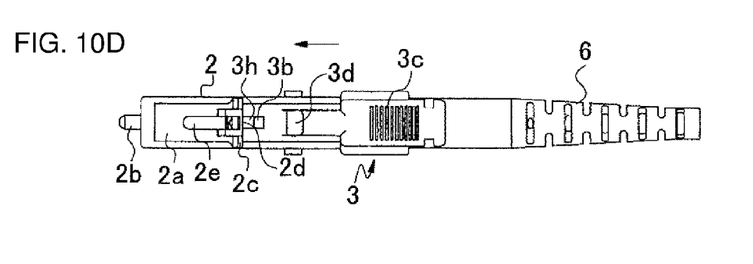
FIG. 10D is a plan view illustrating the optical connector plug.

Next, the rear housing 3 is advanced. As shown in FIG. 9B, 10C or 10D, the hook portion 3b formed on the releasing lever 3a of the rear housing 3 slides on and enters under the releasing portion 2d of the latching piece 2a. The taper portion 3h at a distal end side of the hook portion 3b pushes up the releasing portion 2d, with overcoming elastic force of the latching piece 2a. As shown in FIG. 9C, the hook portion 3b enters into and loosely fits with the slit 2e, formed at a front side of the releasing portion 2d, from below. The elastic force of the latching piece 2a makes the latching piece 2a to return to an original position from an upper position where it is pushed up.

Figure 9D:
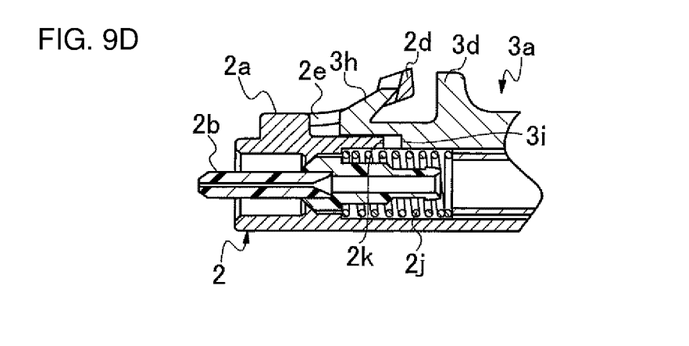
FIG. 9D is a partial vertical section illustrating the front housing and the rear housing in a state where assembling is completed.
Figure 10E:
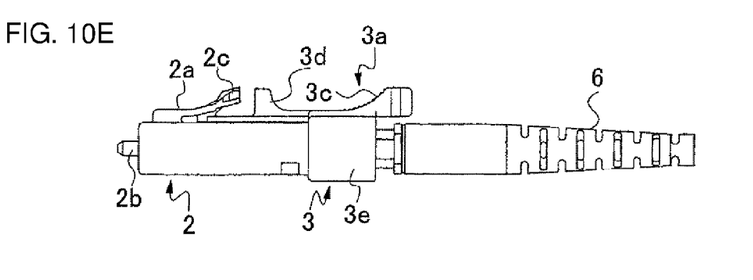
FIG. 10E is a side view illustrating the optical connector plug in the state where the rear housing advances further than in the state shown in FIG. 10C, the hook portion enters and loosely fits with the slit provided before the releasing portion, and the releasing portion returns downward to an original position by elasticity of the latching piece.
Figure 10F:
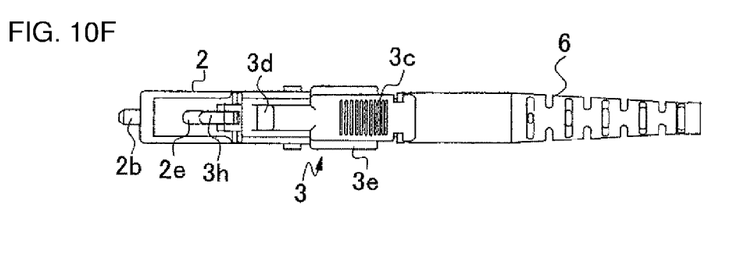
FIG. 10F is a plan view illustrating the optical connector plug.

Simultaneously, the restriction projection 3g, shown in FIG. 7A, formed inside the tubular body 3e of the rear housing 3 falls down into and engages with the rear housing engaging recess 2h, shown in FIG. 3A, of the front housing 2. As shown in FIG. 9C, this causes the position restriction end portion 3i of the rear housing 3 to contact with the front restriction end face 2k of the guiding slit 2g of the front housing 2 so as to restrict forward movement of the rear housing 3. And, the position restriction end face 3j, shown in FIG. 8, of the restriction projection 3g contacts with the rear restriction portion 2f of the rear housing engaging recess 2h, so as to prevent extraction and to restrict backward movement. In this manner, assembly has completed, as shown in FIG. 9D, 10E or 10F.

In use of the optical connector plug 1 constructed in the described manner, the optical connector plug 1 is coupled and optically connected to the coupling counterpart member such as an adaptor or a receptacle. The method will be explained below. First, the optical connector plug 1 in a state shown in FIG. 1, i.e., in a state where the assembly shown in FIG. 9D, 10E or 10F has completed, is put into a fitting opening of the coupling counterpart member, not shown, from a distal end of the front housing 2. A part of the releasing lever 3a is picked and pushed with a finger, and the optical connector plug 1 is inserted into the fitting portion of the coupling counterpart member, not shown.

Accompanying the insertion, the latching piece 2a of the front housing 2 engages with the fitting portion of the coupling counterpart member, and is temporarily pressed down against elastic force of the latching piece 2a. This makes positions of the pair of the locking portions 2c of the latching piece 2a lower than those of the engaging portions, not shown, of the coupling counterpart member. When the optical connector plug 1 is further inserted, the pair of the locking portions 2c pass under the engaging portions, not shown, of the coupling counterpart member. Elastic force of the latching piece 2a pushes up the pair of the locking portions 2c of the latching piece 2a, which engage with the engaging portions, not shown, of the coupling counterpart member. This results in coupling and optical connection of the optical connector plug 1 with the coupling counterpart member, and an unextractable state of the optical connector plug 1 from the coupling counterpart member.

Figure 11A:
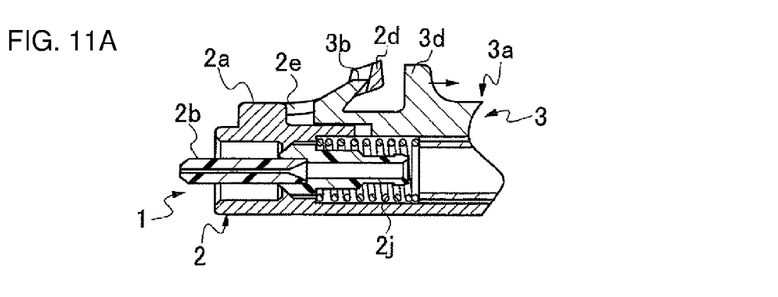
FIG. 11A is a partial vertical section illustrating the front housing and the rear housing in a state where the optical connector plug is coupled with a coupling counterpart member.

In use of the optical connector plug 1, the optical connector plug 1 is released from the coupling counterpart member, after coupled and optically connected with the coupling counterpart member. The method is below. First, the optical connector plug 1 is in a state where it is coupled and optically connected with the coupling counterpart member, as shown in FIG. 11A. The knob portion 3c of the releasing lever 3a of the optical connector plug 1 is picked with a finger and the rear housing 3 is pulled backward.

Figure 11B:
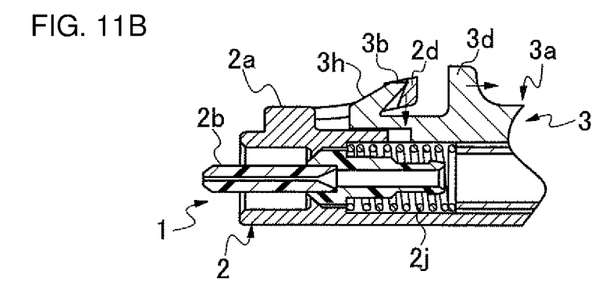
FIG. 11B is a partial vertical section illustrating the front housing and the rear housing in a state where the rear housing is pulled backward from the state shown in FIG. 11A, a rear end of the hook portion engages with the releasing portion, and the hook portion is pressing down the releasing portion.

When the rear housing 3 is pulled backward, the rear housing 3 slides backward relatively to the front housing 2. As shown in FIG. 11B, a rear end of the hook portion 3b loosely fitted in the slit 2e engages with the sloping face 2n formed at a front side of the releasing portion 2d, and slides backward on the sloping face 2n. The releasing portion 2d is pressed down against the elastic force of the latching piece 2a. This releases engagement of the pair of the left and right locking portions 2c formed at the rear end of the latching piece 2a with the engaging portion for fitting, not shown, of the coupling counterpart member.

In this manner, the backward movement of the hook portion 3b of the releasing lever 3a causes pressing down of the locking portion 2c along with the releasing portion 2d of the latching piece 2a, and releasing of engagement of the locking portion 2c with the engaging portion for fitting, not shown, of the coupling counterpart member. When the rear housing 3 is pulled further backward, the optical connector plug 1 is released from the coupling counterpart member. In that time, the restriction projection 3g, shown in FIG. 8, formed inside the tubular body 3e contacts with the rear restriction portion 2f of the rear housing engaging recess 2h, so that backward movement of the rear housing 3 is stopped and restricted. Thereby, the front housing 2 is pulled backward along with the rear housing 3 without separation of the rear housing 3 from the front housing 2. This realizes the releasing of the optical connector plug 1 from the coupling counterpart member.

Figure 11C:
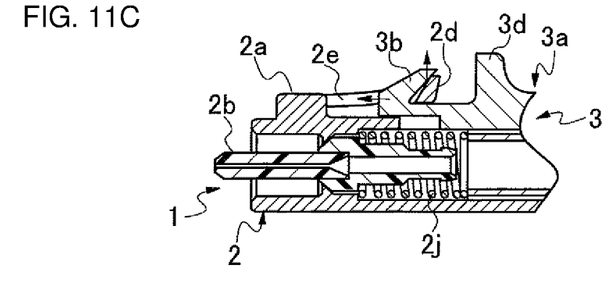
FIG. 11C is a partial vertical section illustrating the front housing and the rear housing in a state where the rear housing is pulled backward further than in the state shown in FIG. 11B, the hook portion presses down the releasing portion, and the optical connector plug is enabled to be released from the coupling counterpart member.
Figure 11D:
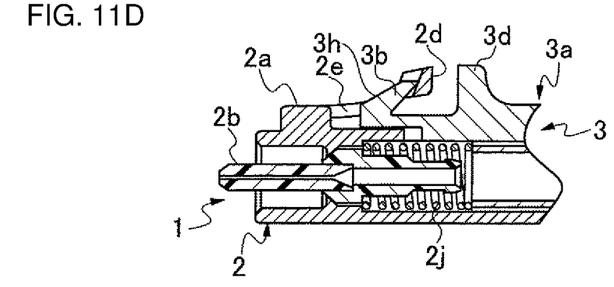
FIG. 11D is a partial vertical section illustrating the front housing and the rear housing in the same state as one before coupling, by taking a finger off from the releasing lever from the state shown in FIG. 11C where the optical connector plug is released from the coupling counterpart member.

Then, the finger is took off from the releasing lever 3a. As shown in FIGS. 11C to 11D, elastic force of the latching piece 2a raises the releasing portion 2d. The sloping face 2n pushes forward the hook portion 3b, engaging with the sloping face 2n at a front side of the releasing portion 2d, in the slit 2e.

In this manner, the optical connector plug 1 comes back to the original state before coupling, as shown in FIG. 11D. As described above, in order to release the optical connector plug 1 from the coupling counterpart member, no operation is required other than pulling the rear housing 3 backward. The single operation of backward pulling enables releasing. This achieves reduction of labor of the releasing work, and enhancement of the operability.

The work for releasing the optical connector plug 1 is completed by the single operation, which is quite easy. Unintentional and mistaken releasing from the coupling counterpart member may produces big damage. Thus, a countermeasure is required to keep a coupling state of the optical connector plug and the coupling counterpart member, and to prevent the optical connector plug 1 from easily releasing from the coupling counterpart member, when the releasing is not intended.

Figure 12A:
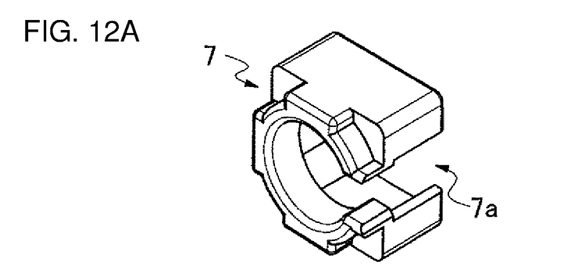
FIG. 12A is a front perspective view illustrating a blocking member configured to block releasing action of the rear housing.
Figure 12B:
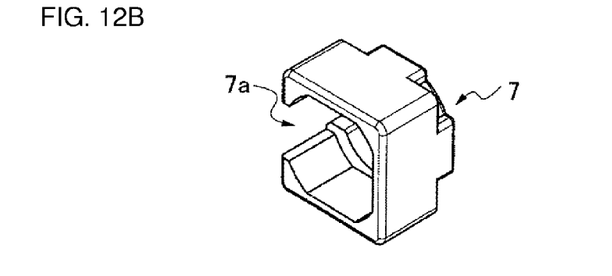
FIG. 12B is a rear perspective view illustrating the blocking member shown in FIG. 12A.

As shown in FIGS. 12A and 12B, the countermeasure is a blocking member 7 mounted for blocking backward movement of the rear housing 3. As shown in the figures, the blocking member 7 is formed as an annular tube shape with a C-shape section partially having a slit 7a, so as to enable to be put into a groove portion 5 shown in FIGS. 1 and 2 from a direction perpendicular to an axis line of a longitudinal direction of the front housing 2.

As shown in FIGS. 1 and 2, a rear end of the front housing 2 is provided with the groove portion 5 for mounting the blocking member 7, which blocks backward slide of the rear housing 3, at a position adjoining the front housing 2 behind when the rear housing 3 is mounted at the rear end and advanced.

As shown in FIGS. 1 and 2, in order to form the groove portion 5, the plug frame 4 formed independently from the front housing 2 and having a tubular shape and a flange at a rear part is inserted and mounted into a rear opening of the front housing, and fixed by partially engaging with the locking window portion 2i, shown in FIG. 5. In other words, the groove portion 5 is formed at a rear part of the plug frame 4. The plug frame 4 is a member for supporting a boot 6 to protect an optical fiber cable, not shown.

Figure 13A:
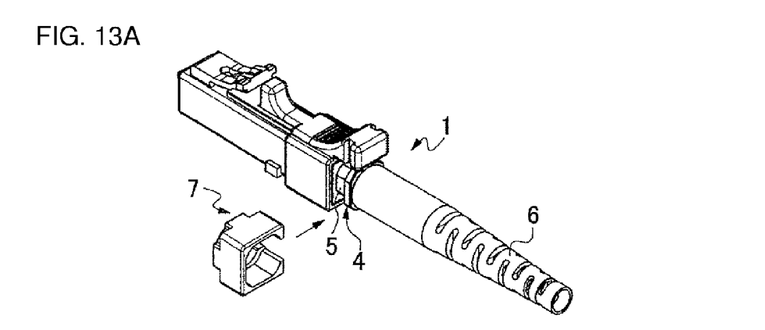
FIG. 13A is a rear perspective view illustrating the blocking member shown in FIG. 12A in a state before it is mounted to the optical connector plug from a left direction.
Figure 13B:
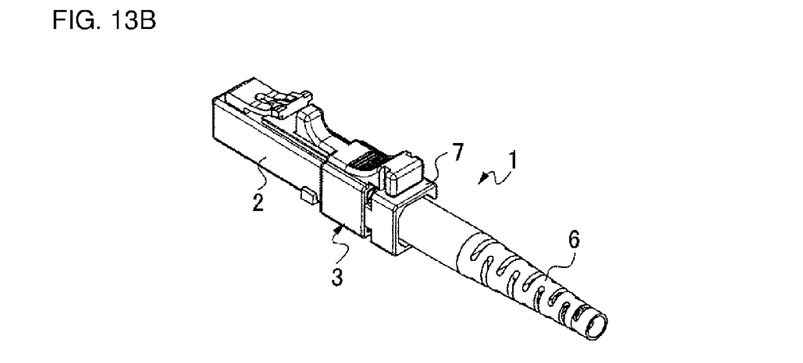
FIG. 13B is a rear perspective view illustrating the blocking member in a state where it is mounted to the optical connector plug from the left direction.

As shown in FIGS. 13A and 13B, using the groove portion 5 of the optical connector plug 1 and the blocking member 7, the blocking member 7 is put into the groove portion 5, and is mounted to the optical connector plug 1. Intervention of a width portion of the blocking member 7 prevents the rear housing 3 from moving backward beyond it. Moreover, a special jig or the like is used for removing the blocking member 7 from the optical connector plug 1.

The blocking member 7 may be mounted to the optical connector plug 1 in advance, and then the optical connector plug 1 may be fitted with the coupling counterpart member. Or, the blocking member 7 may be mounted to the groove portion 5 of the optical connector plug 1 after the optical connector plug 1 is fitted and coupled with the coupling counterpart member. Both sequences are accepted.

Figure 13C:
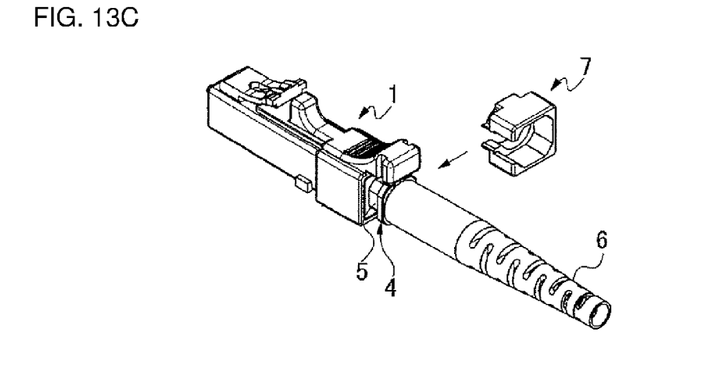
FIG. 13C is a rear perspective view illustrating the blocking member in a state before it is mounted to the optical connector plug from a right direction.
Figure 13D:
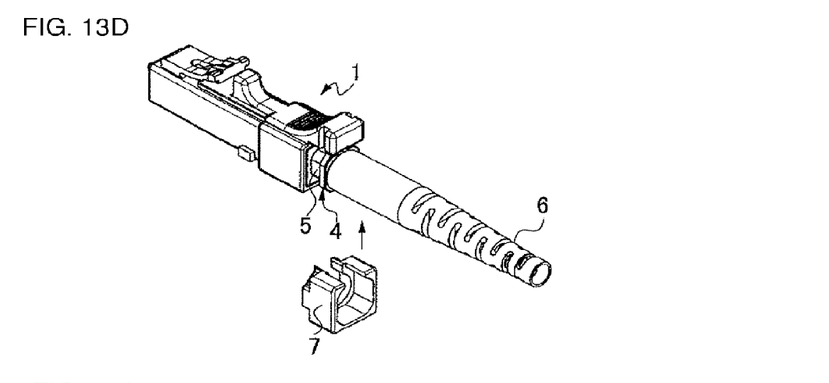
FIG. 13D is a rear perspective view illustrating the blocking member in a state where it is mounted to the optical connector plug from a bottom direction.

As shown not only in FIGS. 13A and 13B but also in FIGS. 13C and 13D, the blocking member 7 may be mounted to the optical connector plug 1 from any directions, such as a left, a right or a bottom direction, perpendicular to the axis line of the longitudinal direction, or front and rear directions, of the front housing.

In a situation where a large number of the optical connector plugs 1 are mounted to an optical communication equipment with high density, the blocking member 7 may be attached or detached from a direction enabling easy operations according to the situation. In a case that a large number of the optical connector plugs 1 are mounted, a large number of the blocking member 7 may have outer surfaces made of materials, or colored, with different colors. This enables the blocking members 7 to be clearly distinguished from each other, and thereby mistaken releasing can be prevented. This is preferable.

INDUSTRIAL APPLICABILITY

The optical connector plug 1 according to the present invention can be used with conventional LC type connectors such as adaptors or receptacles, and easily enhances operability.

REFERENCE SIGNS LIST

1: optical connector plug; 2: front housing; 2a: latching piece; 2b: ferrule; 2c: locking portion; 2d: releasing portion; 2e: slit; 2f: rear restriction portion; 2g: guiding slit; 2h: rear housing engaging recess; 2i: locking window portion; 2j: ferrule biasing member; 2k: front restriction end face; 2m: front housing body; 2n: sloping face; 3: rear housing; 3a: releasing lever; 3b: hook portion; 3c: knob portion; 3d: projection portion; 3e: tubular body; 3f: guiding rail; 3g: restriction projection; 3h: taper portion; 3i: position restriction end portion; 3j: position restriction end face; 3k: taper face; 3m: top face; 4: plug frame; 5: groove portion; 6: boot; 7: blocking member; 7a: slit; 15: conventional optical connector plug; 16: front housing; 17: latching portion; 17a: engaging projection; 17b: distal end; 18: rear housing; 19: releasing bar; 19a: distal end; 20: ferrule; and 21: coupling counterpart member.

The invention claimed is:

1. An optical connector plug, comprising:
a front housing, configured to hold a ferrule and to be fitted with a fitting portion of a coupling counterpart member; and
a rear housing, mounted to the front housing so as to be allowed to slide toward front and rear directions at a rear side of the front housing,
wherein the front housing comprises:
a front housing body; and
a latching piece with elasticity, formed on an upper side outer wall face of the front housing body,
the latching piece comprises:
a locking portion, configured to engage with an engaging portion for fitting of the coupling counterpart member; and
a releasing portion, configured to release the locking portion from an engaging state with the engaging portion for fitting,
the rear housing comprises:
a tubular body; and
a releasing lever, formed at an upper side of the tubular body,
the releasing lever comprises:
a hook portion, formed at a front part of the releasing lever and configured to engage with the releasing portion of the latching piece at a time of retreat of the rear housing, so as to activate a release function; and
a knob portion for retreat, formed at a rear part of the releasing lever, and
the hook portion formed at the releasing lever loosely fits with a slit formed before the releasing portion, by the hook portion sliding with and entering under the releasing portion of the latching piece, a taper portion at a distal end side of the hook portion pushing up the releasing portion and the hook portion entering into the slit when the front housing and the rear housing are assembled.

2. The optical connector plug of claim 1,
wherein the locking portion is a pair of left and right locking portions protruding from left and right side wall faces of the latching piece, and
the releasing portion is formed between the pair of the left and right locking portions.

3. The optical connector plug of claim 2, wherein
a groove portion is formed at a rear part of a plug frame which is positioned at a rear side of the front housing, enabling mounting of a blocking member at a position where the rear part adjoins the rear side of the front housing, the blocking member configured to block backward slide of the rear housing in a state where the rear housing is mounted to the rear side of the front housing and is advanced.

4. The optical connector plug of claim 3, wherein
the blocking member has an annular tube shape with a C-shape section partially having a slit, so as to enable insertion into the groove portion from a direction perpendicular to an axis line of a longitudinal direction of the front housing.

5. The optical connector plug of claim 1,
wherein a groove portion is formed at a rear part of a plug frame which is positioned at a rear side of the front housing, enabling mounting of a blocking member at a position where the rear part adjoins the rear side of the front housing, the blocking member configured to block backward slide of the rear housing in a state where the rear housing is mounted to the rear side of the front housing and is advanced.

6. The optical connector plug of claim 5,
wherein the blocking member has an annular tube shape with a C-shape section partially having a slit, so as to enable insertion into the groove portion from a direction perpendicular to an axis line of a longitudinal direction of the front housing.

7. The optical connector plug of claim 1,
wherein the releasing lever is provided with a projection portion protruding between the hook portion formed at a front part and the knob portion formed at a rear part of the releasing lever, the projection portion functioning as a reaction force portion for advancing the rear housing.

* * * * *